United States Patent [19]

Smith

[11] Patent Number: 5,305,857
[45] Date of Patent: Apr. 26, 1994

[54] TRAILER BRAKE SET APPARATUS

[76] Inventor: Terry L. Smith, 42801 SE. Oral Hull Rd., Sandy, Oreg. 97055

[21] Appl. No.: 14,747

[22] Filed: Feb. 8, 1993

[51] Int. Cl.$^5$ ............................................. F16D 69/00
[52] U.S. Cl. ...................................... 188/265; 188/78
[58] Field of Search ............. 188/78, 106 A, 156-158, 188/265, 353; 180/287

[56] References Cited

U.S. PATENT DOCUMENTS

| | | | |
|---|---|---|---|
| 2,407,510 | 10/1943 | Oetzel | 188/158 |
| 2,642,484 | 6/1953 | Price | 188/353 |
| 2,886,141 | 5/1959 | House | 188/78 |
| 4,951,776 | 8/1990 | Jeter | 188/353 |

Primary Examiner—Robert J. Oberleitner
Assistant Examiner—Chris Schwartz
Attorney, Agent, or Firm—Leon Gilden

[57] ABSTRACT

An apparatus to effect the engagement of brake shoes relative to a trailer axle of an associated trailer includes rotating rod members directed from a central housing, wherein the rod members are arranged to project rotatably through the brake backing plate of respective wheel members to effect actuation of a cam structure to effect engagement of the brake shoes of an associated wheel, with a brake drum arrangement.

4 Claims, 4 Drawing Sheets

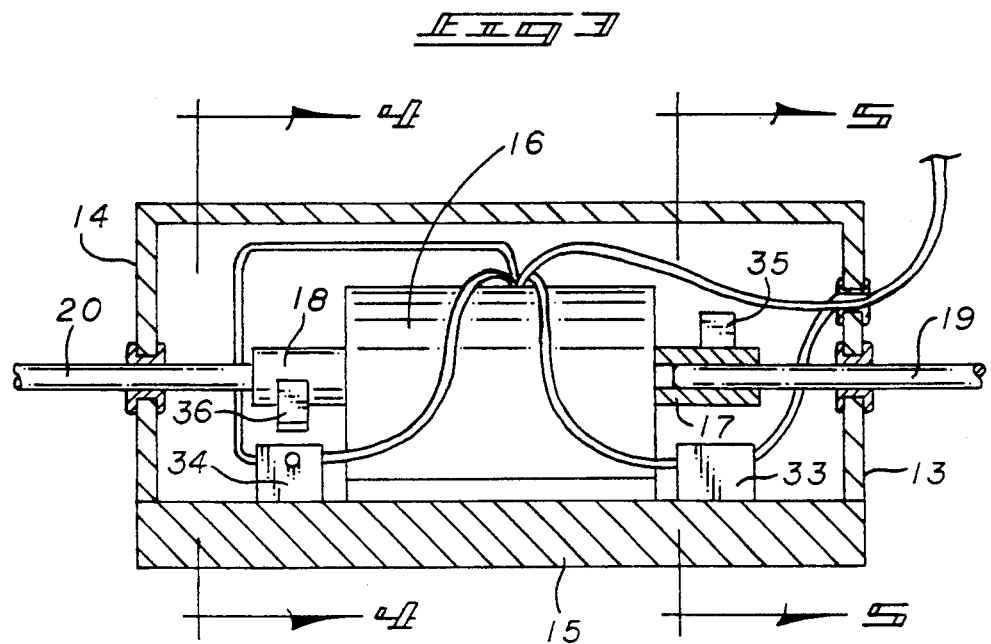
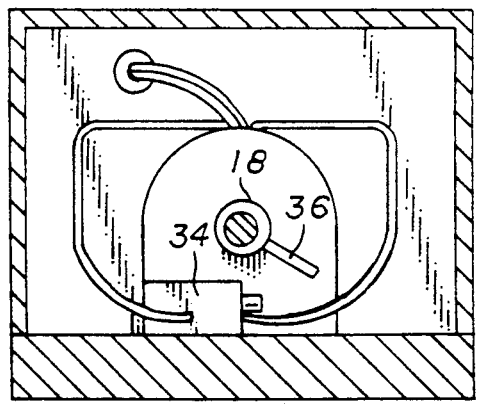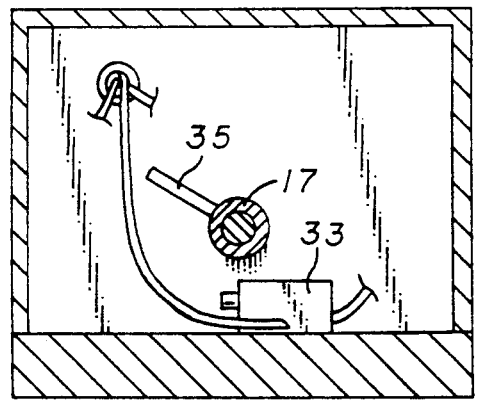

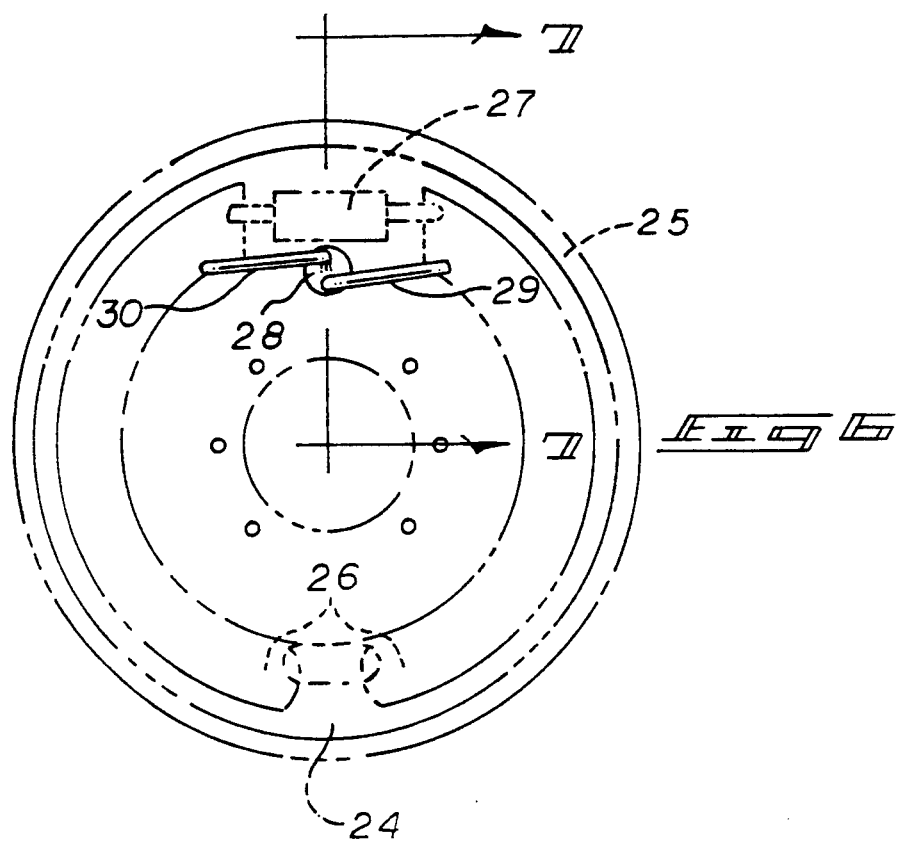
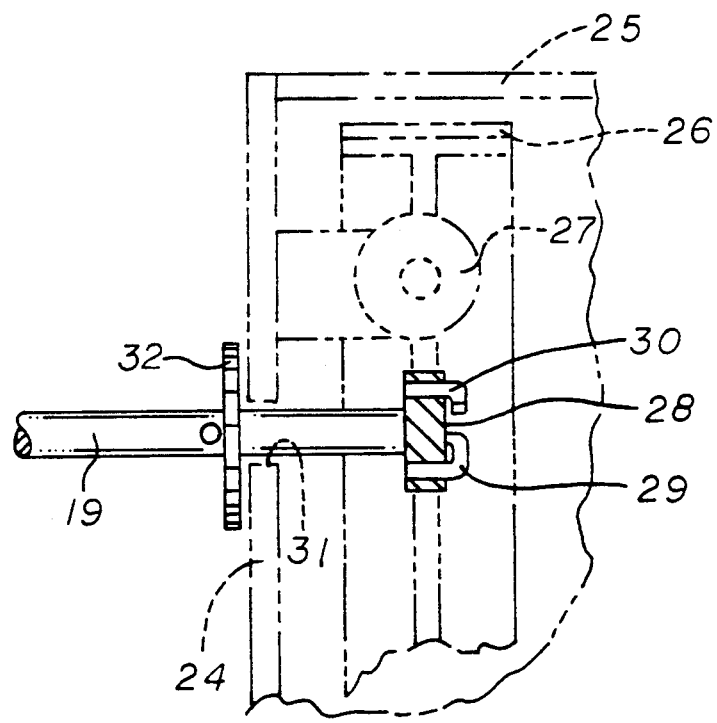

TRAILER BRAKE SET APPARATUS

BACKGROUND OF THE INVENTION

1. Field of the Invention

The field of the invention relates to trailer brake apparatus, and more particularly pertains to a new and improved trailer brake set apparatus wherein the same is arranged to effect the setting of trailer brakes preventing inadvertent rolling and movement of the trailer.

2. Description of the Prior Art

Trailer brake structure o various types are utilized in the prior art exemplified in the U.S. Pat. No. 4,515,394 to Zwick wherein a wheel lock is arranged for operation with a trailer.

U.S. Pat. No. 5,069,472 indicates the use of an electronically controlled fluid release fifth wheel structure for braking of a trailer.

U.S. Pat. No. 4,951,776 to Jeter sets forth a vehicular anti-theft structure, wherein electronic structure is arranged to effect locking of brakes relative to the master cylinder structure of an associated vehicle.

The instant invention attempts to overcome deficiencies of the prior art wherein a locking structure is arranged to provide for selective locking of the trailer brakes of an associated trailer and in this respect, the present invention substantially fulfills this need.

SUMMARY OF THE INVENTION

In view of the foregoing disadvantages inherent in the known types of trailer brake apparatus now present in the prior art, the present invention provides a trailer brake set apparatus wherein the same converts electrical to mechanical actuation of brake shoes into engagement with an associated brake drum of a trailer vehicle. As such, the general purpose of the present invention, which will be described subsequently in greater detail, is to provide a new and improved trailer brake set apparatus which has all the advantages of the prior art trailer brake apparatus and none of the disadvantages.

To attain this, the present invention provides an apparatus to effect the engagement of brake shoes relative to a trailer axle of an associated trailer including rotating rod members directed from a central housing, wherein the rod members are arranged to project rotatably through the brake backing plates of respective wheel members to effect actuation of a cam structure to effect engagement of the brake shoes of an associated wheel with a brake drum arrangement.

It is another object of the present invention to provide a new and improved trailer brake set apparatus which may be easily and efficiently manufactured and marketed.

It is a further object of the present invention to provide a new and improved trailer brake set apparatus which is of a durable and reliable construction.

An even further object of the present invention is to provide a new and improved trailer brake set apparatus which is susceptible of a low cost of manufacture with regard to both materials and labor, and which accordingly is then susceptible of low prices of sale to the consuming public, thereby making such trailer brake set apparatus economically available to the buying public.

Still yet another object of the present invention is to provide a new and improved trailer brake set apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 2 in the direction indicated by the arrows.

FIG. 4 is an orthographic view, taken along the lines 4—4 of FIG. 3 in the direction indicated by the arrows.

FIG. 5 is an orthographic view, taken along the lines 5—5 of FIG. 3 in the direction indicated by the arrows.

FIG. 6 is an orthographic view, taken along the lines 6—6 of FIG. 1 in the direction indicated by the arrows.

FIG. 7 is an orthographic view, taken along the lines 7—7 of FIG. 6 in the direction indicated by the arrows.

DESCRIPTION OF THE PREFERRED EMBODIMENT

Figure 1:
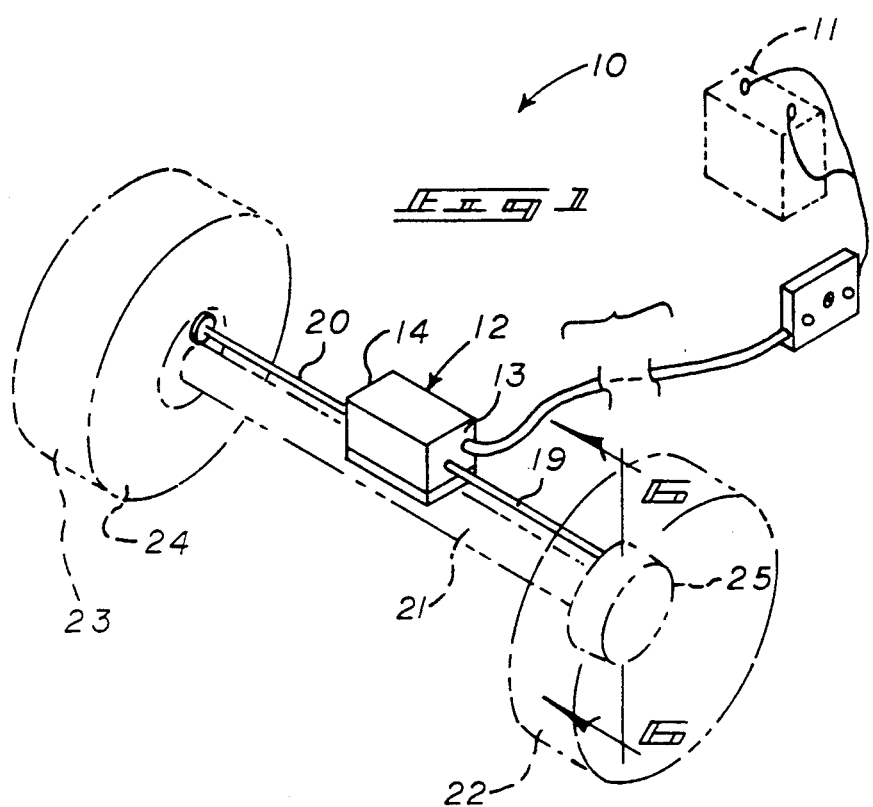
FIG. 1 is an isometric illustration of the invention mounted to a trailer axle.
Figure 2:
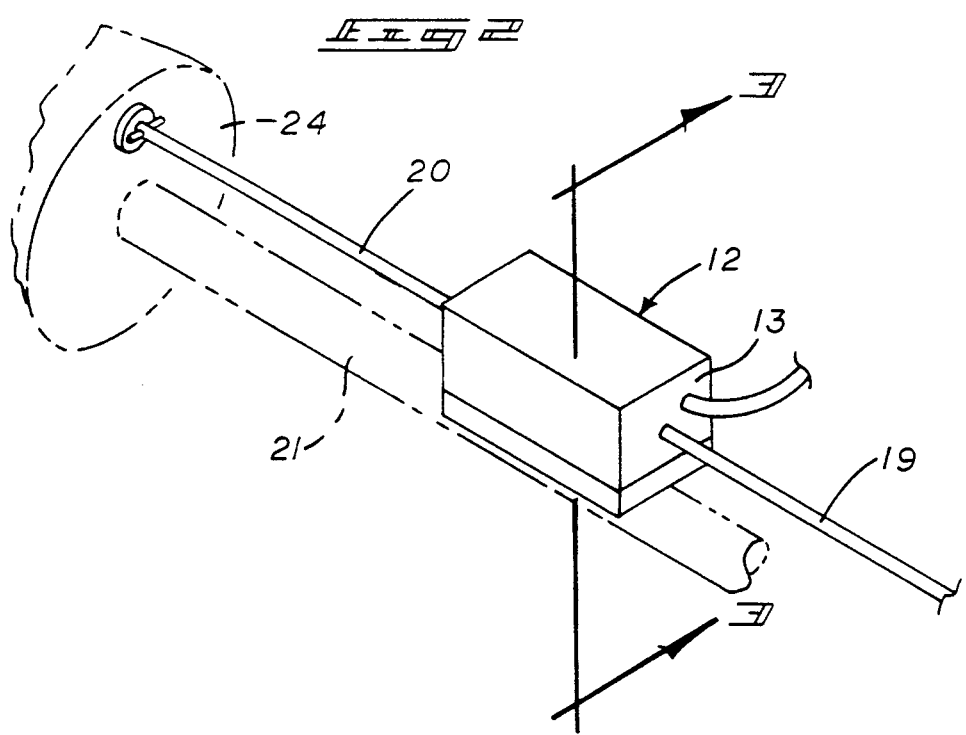
FIG. 2 is an enlarged isometric illustration of the control housing mounted to the axle housing.
Figure 8:
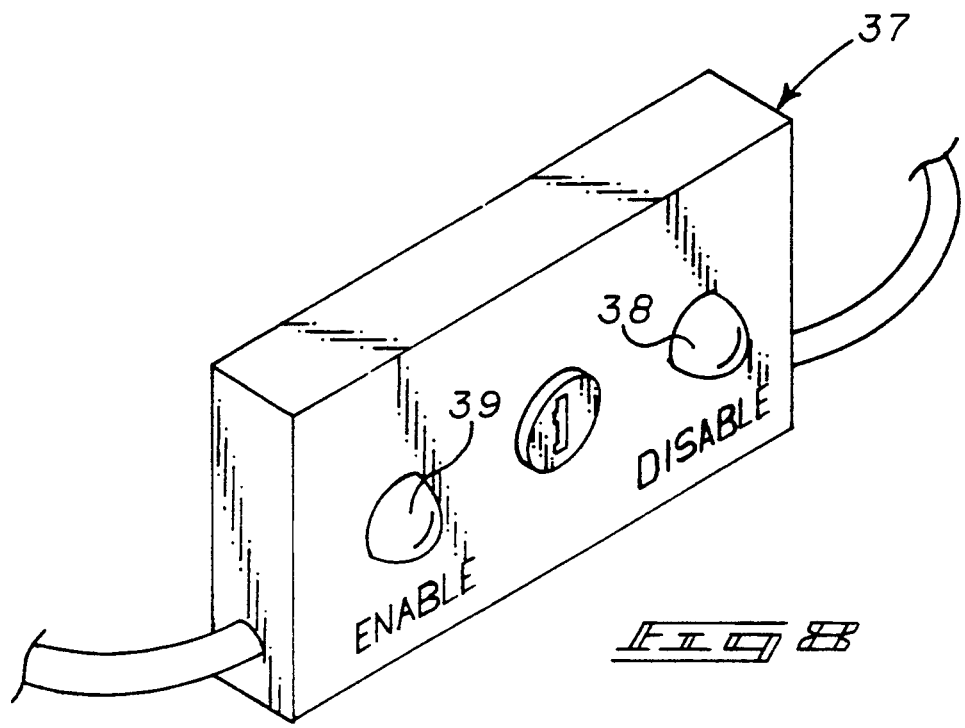
FIG. 8 is an enlarged isometric illustration of the indicator housing employed by the invention.
Figure 9:
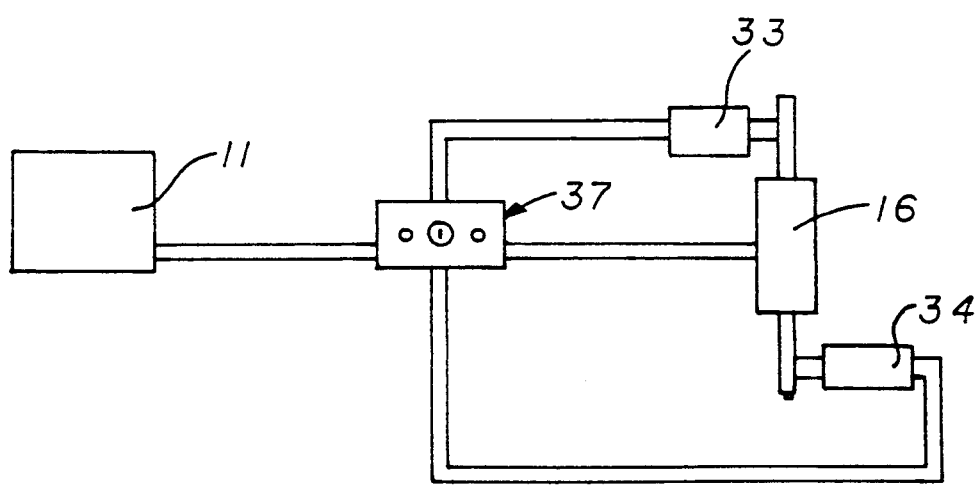
FIG. 9 is a diagrammatic illustration of the indicator housing arranged in cooperation with the battery and drive motor of the invention.

With reference now to the drawings, and in particular to FIGS. 1 to 9 thereof, a new and improved trailer brake set apparatus embodying the principles and concepts of the present invention and generally designated by the reference numeral 10 will be described.

More specifically, the trailer brake set apparatus 10 of the instant invention essentially comprises a control housing 12, having housing first and second side walls 13 and 14 and a housing base 15 fixedly mounted to an axle housing 21 intermediate respective first and second wheels 22 and 23. A control housing 12 includes a reversible drive motor 16 fixedly mounted within the control housing 12 intermediate the first and second side walls 13 and 14, with the drive motor having respective coaxially aligned first and second output shafts 17 and 18 rotatably directed through the respective first and second walls 13 and 14. A first extension shaft 19 mounted to the first output shaft 17 and a second extension shaft 20 mounted to the second output shaft 18 are rotatably directed through respective wheel brake backing plates 24 (see FIGS. 2-7), with each wheel brake backing plate 24 fixedly mounted to an opposed end of the axle housing 21. Each of the wheel brake backing plates 24 is cooperative with a wheel brake drum 25, with facing arcuate brake pads 26 mounted upon each wheel brake backing plate 24 for selective engagement with an associated and respective brake drum 25 exemplified in the FIGS. 6 and 7. A hydraulic wheel cylinder 27 of conventional construction is mounted to the brake backing plate 24 for cooperation with a conventional hydraulic braking system to effect pivoting of the brake pads 26 for engagement with an associated brake drum 25.

With specific reference to the FIGS. 6 and 7, each outer distal end of each extension shaft 19 an 20 includes a rotary camming plate 28 fixedly mounted thereto, with the rotary camming plate arranged in orthogonal relationship relative to an associated extension shaft, with each camming plate 28 having respective first and second cam links 29 and 30 mounted to respective first and second brake pads of the brake pad set 26. The first and second cam links 29 and 30 are pivotally mounted eccentrically relative to and on opposed sides of a respective camming plate 28, whereupon rotation of each camming plate 28 by rotation of the respective extension shafts 19 and 20 upon rotation of the drive motor 16 in a first direction, the brake pads 26 are arranged for engaged relationship relative to an associated brake drum 25. The extension shafts 19 and 20 are rotatably mounted through a respective backing plate bore 31 through a respective brake backing plate 24 receiving the extension shaft, with the extension shaft having a seal plate 32 fixedly mounted to the extension shaft in adjacency to the brake backing plate 24 between the brake backing plate 24 and the control housing 12.

The control housing 12 includes respective first and second limit switches 33 and 34 positioned adjacent the respective first and second output shafts 17 and 18, with the limit switches arranged for engagement with respective first and second switch engaging plates 35 and 36 that are in turn respectively mounted to the first and second output shafts 17 and 18 to curtail rotation of the drive motor in rotation and contrarotation of the drive motor to effect latching and delatching of the brake pads 26 relative to an associated brake drum 25.

An indicator housing switch 37 is provided, typically mounted within a passenger compartment of a tow vehicle, but may be positioned anywhere that is conveniently visible, with the indicator housing 37 having first and second indicator lights 38 and 39 to indicate actuation and deactuation of the brake pads relative to an associated brake drum. The indicator housing, as indicated, is arranged in electrical communication between the drive motor and a trailer battery 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer brake set apparatus in combination with an axle housing, wherein the axle housing includes a housing first end spaced from a housing second end, with the first end and the second end each including a wheel assembly rotatably mounted thereto, and each wheel assembly including a brake backing plate fixedly mounted to said axle housing, and each backing plate including a plurality of facing brake pads, including a first brake pad and a second brake pad, and each wheel assembly further including a brake drum rotatably mounted about the first brake pad and the second brake pad, wherein the apparatus further comprises,
   a control housing fixedly mounted to the axle housing, and the control housing including a housing first side wall spaced from a housing second side wall, and
   a reversible drive motor mounted within the housing between the first side wall and the second side wall, with the drive motor having a first output shaft and second output shaft rotatably mounted to the drive motor in adjacency relative to the respective first side wall and the second side wall, wherein the first output shaft includes a first extension shaft directed from the first output shaft, and the second output shaft including a second extension shaft mounted to the second output shaft, where one of said first and second extension shafts are rotatably directed through one said backing plate, and
   switch means for effecting rotation and contra-rotation of the drive motor, and
   each wheel assembly including cam means mounted within each wheel assembly for effecting engagement of each first brake pad and second brake pad for engagement with an adjacent brake drum.

2. An apparatus as set forth in claim 1 wherein the cam means includes a cam plate fixedly mounted to each extension shaft intermediate the first brake pad and the second brake pad, and the cam plate having a first cam link pivotally mounted to the cam plate and to the first brake pad, and a second cam link diametrically opposed to the first cam link, with the second cam link mounted pivotally to the cam plate and to the second brake pad, whereupon rotation of the cam plate effects engagement of the first brake pad and the second brake pad to the brake drum.

3. An apparatus as set forth in claim 2 wherein each extension shaft is rotatably directed through a brake backing plate bore in each backing plate.

4. An apparatus as set forth in claim 3 wherein the control housing includes a first limit switch in adjacency to the first output shaft and a second limit switch in adjacency to the second output shaft, and the first output shaft including a first engaging plate, and the second output shaft including a second engaging plate, wherein the first engaging plate is arranged for engagement with the first limit switch to cease rotation of the drive motor in a first orientation, and wherein the second engaging plate is arranged for engagement with the second limit switch to cease rotation of the drive motor in a second orientation opposed to that of the first orientation.

* * * * *